United States Patent
Moon et al.

(10) Patent No.: US 7,799,236 B2
(45) Date of Patent: Sep. 21, 2010

(54) GATHERING METHOD AND APPARATUS OF POWDER SEPARATED SOLUBLE COMPONENT

(75) Inventors: Won Jae Moon, Daejeon Metropolitan (KR); Dae Gon Han, Daejeon Metropolitan (KR); Ick Soon Kwak, Daejeon Metropolitan (KR); Jung Hyun Oh, Daejeon Metropolitan (KR)

(73) Assignee: LG Chem, Ltd., Seoul (KR)

( * ) Notice: Subject to any disclaimer, the term of this patent is extended or adjusted under 35 U.S.C. 154(b) by 950 days.

(21) Appl. No.: 11/511,533

(22) Filed: Aug. 29, 2006

(65) Prior Publication Data
US 2007/0045200 A1   Mar. 1, 2007

(30) Foreign Application Priority Data
Aug. 30, 2005  (KR) .................... 10-2005-0079883
Feb. 13, 2006  (KR) .................... 10-2006-0013630

(51) Int. Cl.
| B01D 21/00 | (2006.01) |
|---|---|
| B01D 29/00 | (2006.01) |
| B01D 37/00 | (2006.01) |
| B01D 41/04 | (2006.01) |
| C02F 1/00 | (2006.01) |

(52) U.S. Cl. ................ 210/804; 210/767; 210/803; 210/108; 210/411; 210/533; 210/534; 210/416.1; 210/743; 210/746

(58) Field of Classification Search ............ 422/255, 422/261, 267, 281; 210/108, 408, 409, 411, 210/743, 746, 791, 209, 299, 312, 313, 533, 210/534, 535, 803, 804; 134/103.1, 104.3, 134/111, 133, 184, 186, 10, 18, 25.1, 25.5, 134/32, 34; 208/390; 423/98
See application file for complete search history.

(56) References Cited

U.S. PATENT DOCUMENTS

| 3,347,637 | A | * | 10/1967 | Price et al. | 422/269 |
|---|---|---|---|---|---|
| 3,948,774 | A | * | 4/1976 | Lindman | 210/192 |
| 4,059,531 | A | * | 11/1977 | Tardivel | 210/522 |
| 4,234,429 | A | * | 11/1980 | Rhodes et al. | 423/109 |
| 5,366,634 | A | * | 11/1994 | Vijayan et al. | 210/638 |
| 5,932,092 | A | * | 8/1999 | Hawk et al. | 210/167.25 |
| 5,997,750 | A | * | 12/1999 | Rozelle et al. | 210/744 |
| 6,203,704 | B1 | * | 3/2001 | Tateishi et al. | 210/634 |
| 6,495,044 | B1 | * | 12/2002 | Verdoes | 210/634 |
| 6,592,758 | B2 | * | 7/2003 | Quintel | 210/232 |
| 2004/0134842 | A1 | * | 7/2004 | Ricketts | 210/107 |
| 2004/0262209 | A1 | * | 12/2004 | Umezawa et al. | 210/220 |

FOREIGN PATENT DOCUMENTS

| GB | 1433324 A * | 4/1976 |
|---|---|---|
| JP | 61-071850 | 4/1986 |

(Continued)

*Primary Examiner*—Duane Smith
*Assistant Examiner*—Paul J Durand
(74) *Attorney, Agent, or Firm*—McKenna Long & Aldridge LLP

(57) ABSTRACT

An apparatus for collecting soluble component-removed powder that collects soluble component-removed and poorly soluble component-containing powder to recycle by removing the soluble component from the powder through filtering using a vacuum pump after mixing soluble component-removed and poorly soluble component-containing powder and a solvent dissolving the soluble component, and a method of the same.

15 Claims, 4 Drawing Sheets

FOREIGN PATENT DOCUMENTS

| | | |
|---|---|---|
| JP | 5-154470 | 6/1993 |
| JP | 09-253456 | 9/1997 |
| JP | 2003-080185 | 3/2003 |
| JP | 2003-071445 | 11/2003 |
| JP | 2004-358288 | 12/2004 |
| KR | 10-0333497 | 4/2002 |
| KR | 10-0338471 | 5/2002 |

* cited by examiner

[Figure 1]
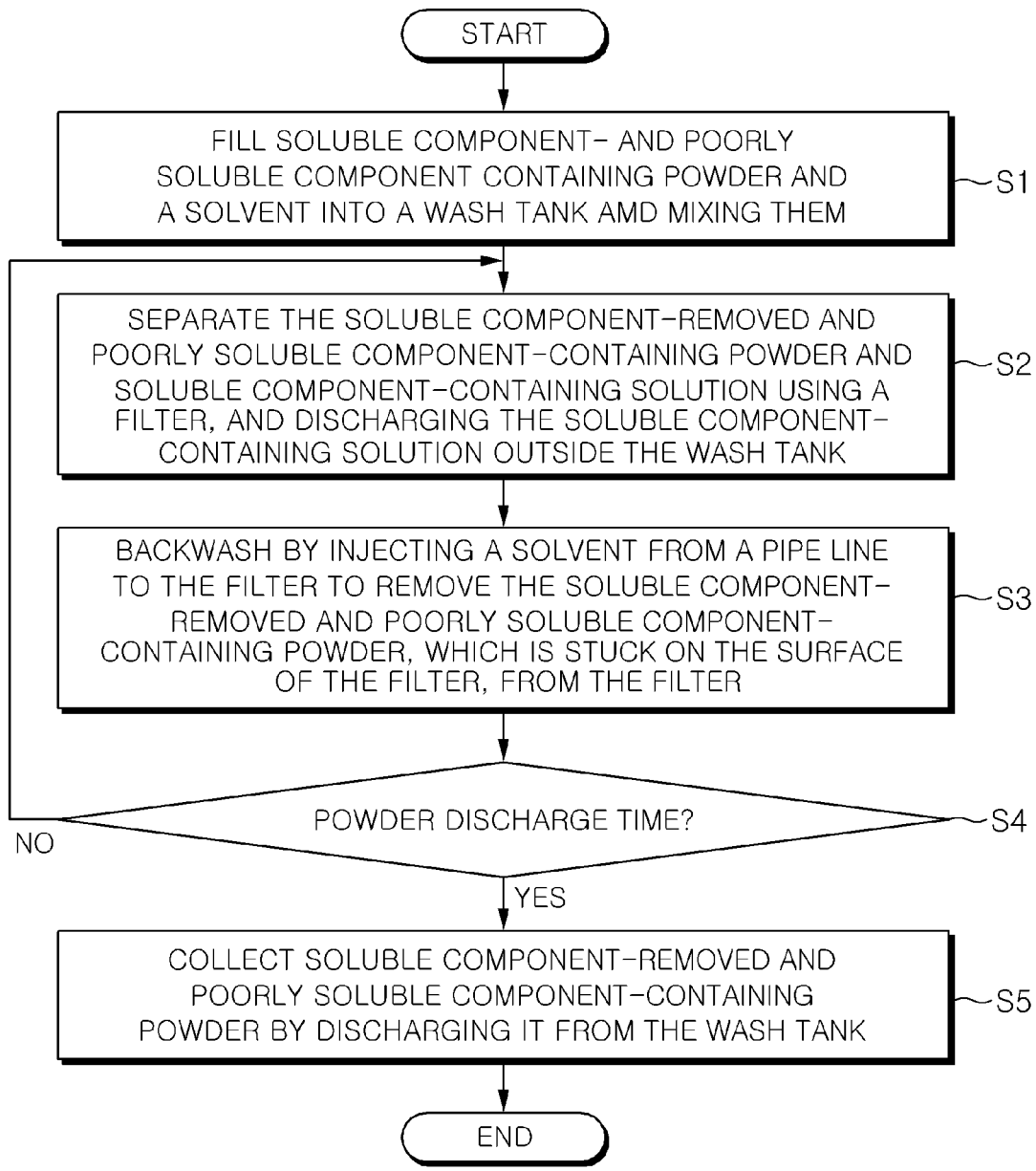

【Figure 2】
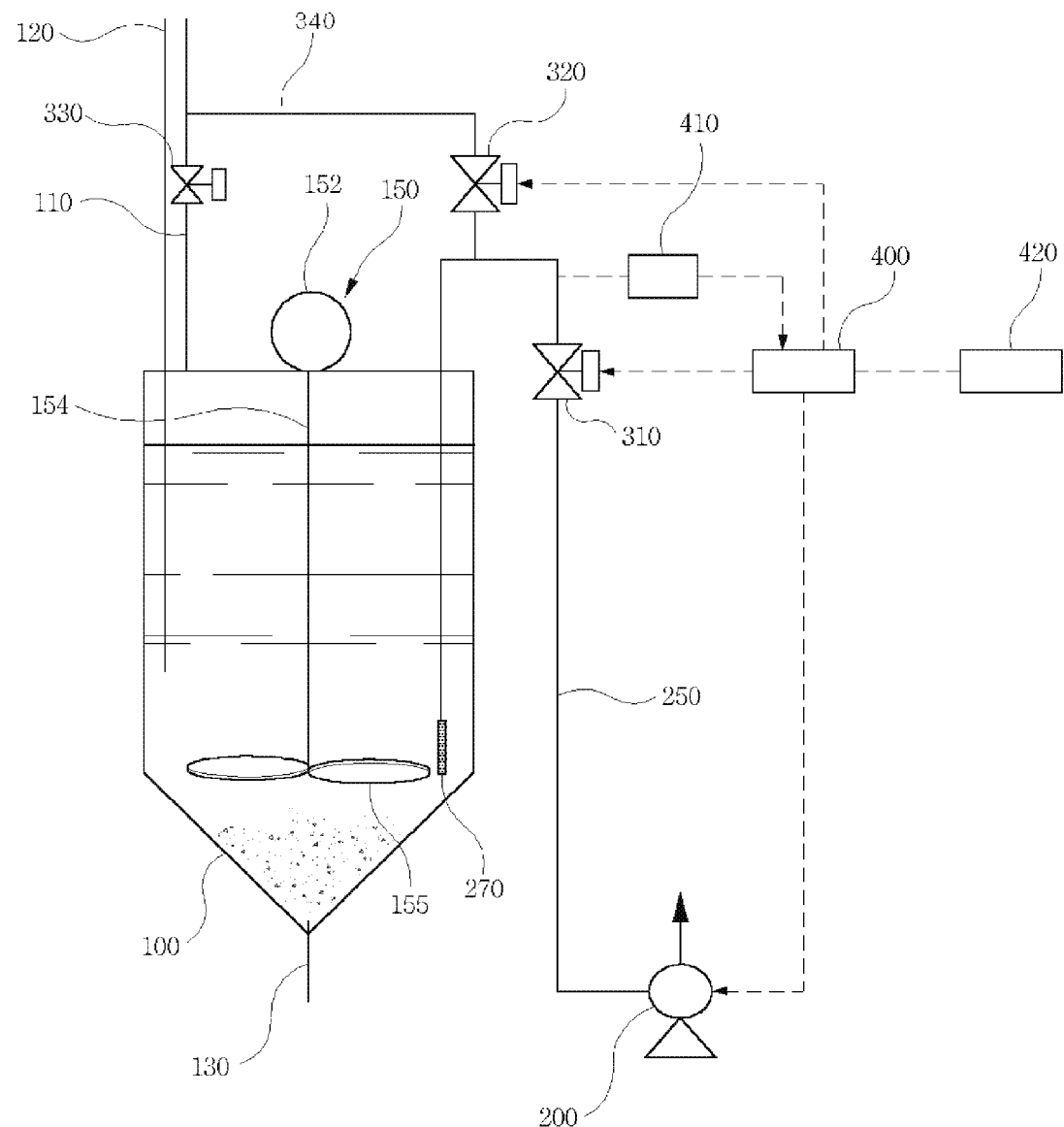

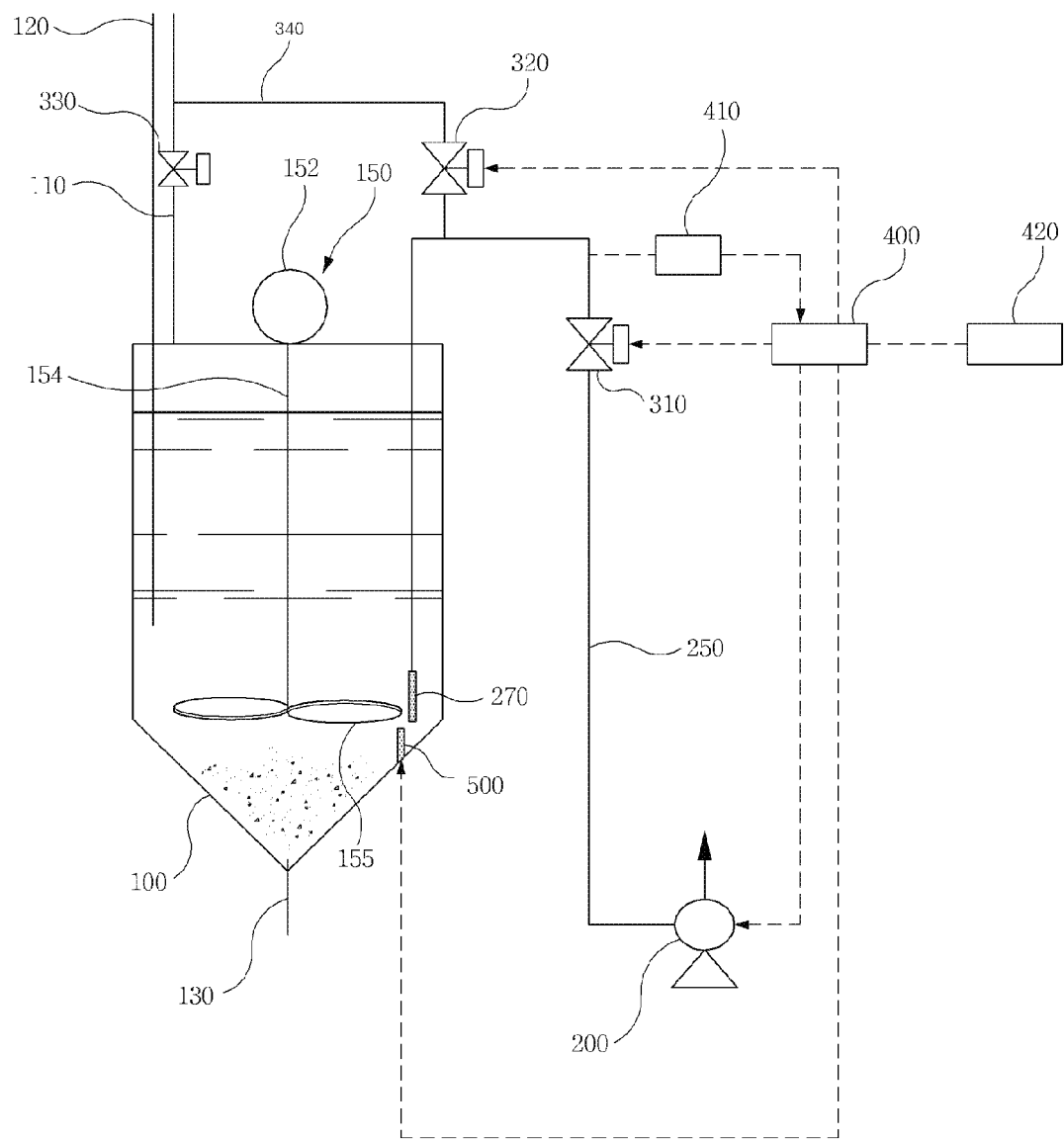
[Figure 3]

[Figure 4]
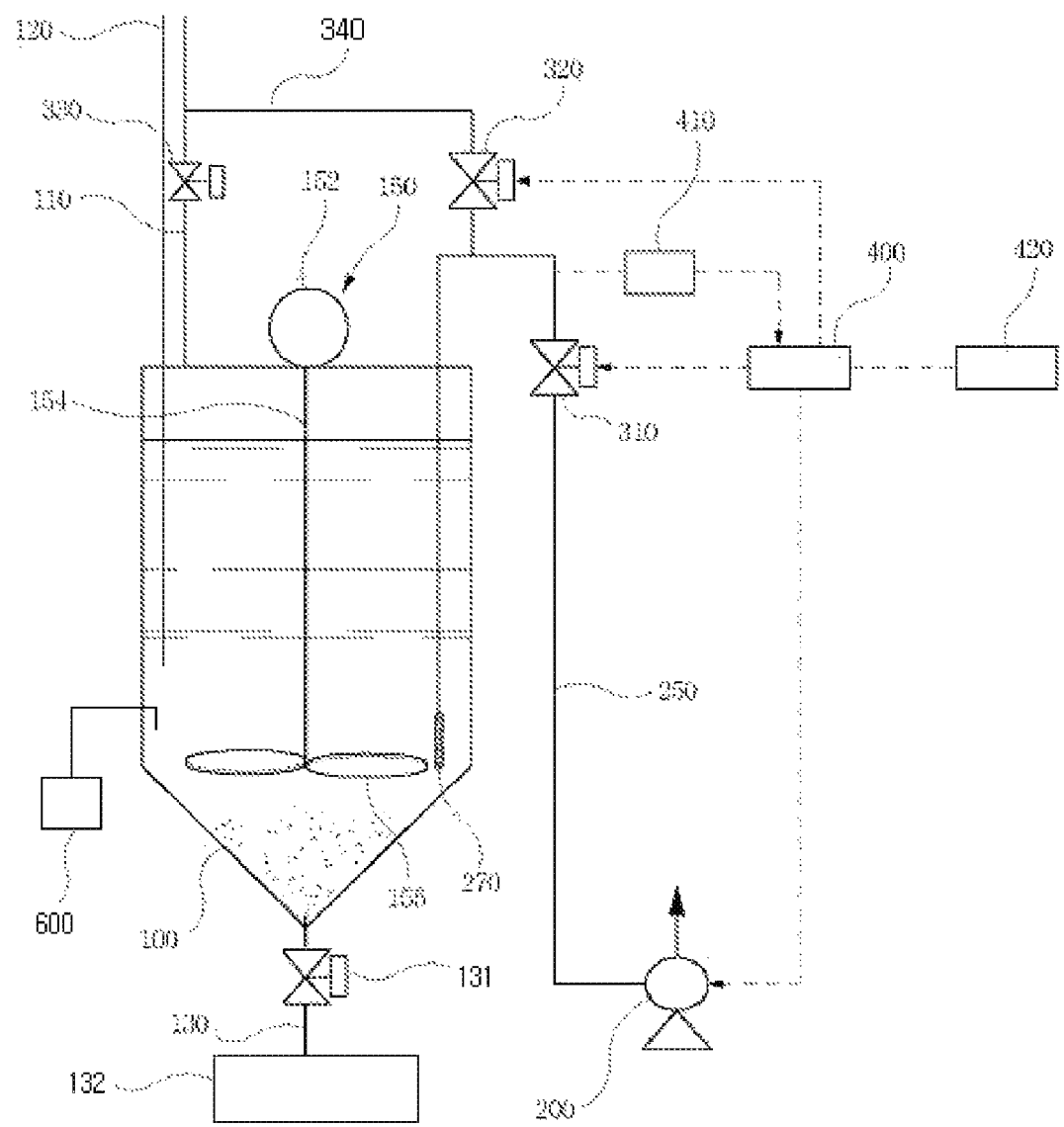

GATHERING METHOD AND APPARATUS OF POWDER SEPARATED SOLUBLE COMPONENT

TECHNICAL FIELD

The present invention relates to an apparatus for collecting soluble component-removed powder that easily collects soluble component-removed powder by removing a solution in a tank, where soluble component- and poorly soluble component-containing powder and a solvent dissolving the soluble component are mixed, using suction force by vacuum pumping and prevents overload by adding backwashing in the suction of the solution, and a method of the same.

The present application is based on, and claims priority from, Korean Patent Application Nos. 10-2005-0079883 and 10-2006-0013630, filed on Aug. 30, 2005 and Feb. 13, 2006, respectively, the disclosure of which is hereby incorporated by reference herein in its entirety.

BACKGROUND ART

In general, known in the art as a method of removing a soluble component, such as salt, from polymer powder or oxidized powder, are a sedimentation method that precipitates soluble component-containing powder mixed with a solvent in a tank, thereafter repeats separating of the precipitated powder from the solvent containing the dissolved soluble component and a centrifugal method that separates particles by rotating a container filled with a solution where soluble component-containing powder and a solvent are mixed, using a difference in density of the solution and powder.

A known sedimentation method, however, is rapidly processed when the particles of soluble component-containing powder is 10 μm or more in size, whereas when the particles are smaller than that and have floatability, it takes a long time to precipitate the powder, which results in extending the process cycle to separate the powder from the solution and deteriorating workability.

On the other hand, as for washing by a centrifugal method, when a large amount of particles are contained, a motor rotating a container at high speeds may overload and break down.

Further, an example for overcoming the problems in the art is disclosed in Japanese Patent Application Publication No. 2004-358288, titled "METHOD FOR WASHING/DESALTING INCINERATION ASH". According to the method, soot and dust produced when combustible waste is incinerated are incorporated with inorganic powder of 10 to 200 μm in average particle size, and a mixture is incorporated with water to make slurry. The slurry is separated into inorganic solids and an aqueous solution in which salts are dissolved by a solid-liquid separation process using a belt filter.

The aforementioned method, however, has a problem in that even though the washing/desalting is effectively processed by loading of a filter, solids of which particle size is about 1 μm due to the limitation of unwoven fabric may come out and not only a large amount of space and cost for mounting the belt filter are required, but a specific process is required to separate the inorganic solids from the surface of the filter.

DISCLOSURE

Technical Problem

In order to overcome the above problems, an object of the invention is to provide an apparatus that collects soluble component-removed powder by separating soluble component-removed powder from a mixture containing soluble component- and poorly soluble component-containing powder and a solvent dissolving the soluble component, regardless of the size and amount of particles and a method thereof.

Technical Solution

According to an embodiment of the invention, an apparatus for collecting soluble component-removed powder, comprising: a wash tank that has an internal receiving space; a powder supplier that is disposed above the wash tank and supplies soluble component- and poorly soluble component-containing powder to the wash tank; a solvent supplier that is disposed above the wash tank and supplies a solvent dissolving the soluble component contained in the powder to the wash tank; a pipe line of which an end is placed in the wash tank and the other end is placed outside the wash tank; a filter that is provided at the end of the pipe line in the wash tank; a pump, when the pump is in operation, that is connected with the outside end of the pipe line and applies vacuum negative pressure in the pipe line; a backwashing means that injects a solvent to the filter through the pipe line to remove, from the filter, the soluble component-removed powder stuck to the filter during the pumping of the pump as the soluble component is dissolved in the solvent, before which, the soluble component- and poorly soluble component-containing powder is mixed with the solvent in the wash tank; a powder discharge port that is disposed at a bottom of the wash tank and discharges the soluble component-removed powder out of the wash tank; and a controller that individually controls the pump, the backwashing means, and the powder discharge port.

The above apparatus may include a bubble generator that is disposed at a lower portion of the filter in the wash tank, generates bubbles and guides the bubbles to the filter, a stirrer that is disposed in the wash tank and mixes the soluble component- and poorly soluble component-containing powder and the solvent, and a solvent supply valve that is disposed on the solvent supplier and controls the flow rate of the solvent supplied into the wash tank.

The backwashing means may include a first opening/closing valve that is provided to the pipe line between the filter and the pump and controls the flow of the solvent flowing from the filter to the pump by opening and closing according to control of the controller; and a second opening/closing valve that is provided between the first opening/closing valve and the filter and controls the flow of the solvent supplied to the filter through the pipe line by opening and closing according to control of the controller.

The backwashing means further includes a backwashing solvent supply pipe line of which an end is connected to the solvent supplier and the other end is connected to the pipe line and which is provided with the second opening/closing valve. The backwashing solvent supply pipe line guides the solvent of the solvent supplier to the pipe line so that the solvent of the solvent supplier flows to the filter through the pipe line, when the first opening/closing valve is closed and the second opening/closing valve is open.

Meanwhile, the controller may include a control part that outputs a control signal to change the operation of the pump and backwashing means on the basis of preset data value depending on component and content of the powder that contains the soluble and poorly soluble component and the solvent that are put into the wash tank.

The controller calculates a vacuum pumping time of the pump on the basis of preset data value at a control part, and may periodically operate the backwashing in a control mode using the timer by inputting the calculated data to the timer.

Alternatively, the controller may include a pressure sensor that senses the vacuum pressure in the pipe line; and a control part that turns on the backwashing means when the pressure in the pipe line sensed by the pressure sensor is lower than a preset pressure.

The pressure set by the control part is $-0.8$ kg/cm$^2$.

Further, the apparatus may include a powder discharge time detecting means that detects the discharge time of the soluble component-removed powder discharged through the powder discharge port; and a discharge valve that is provided on the powder discharge port, in which the controller opens or closes the powder discharge port by controlling the discharge valve on the basis of data detected by the powder discharge time detecting means.

The powder discharge time detecting means may be any one of a pH measuring part that measures pH of the solution in the wash tank containing the soluble component, and an electric conductivity measuring instrument that measures the electric conductivity of the solution in the wash tank containing the soluble component.

The controller may open the discharge valve so that the soluble component-removed powder is discharged through the powder discharge port when the pH of the solution in the wash tank that is measured by the pH measuring part is a preset standard pH. The standard pH is determined depending on the type of powder put into the wash tank. When the standard pH is set to 6 according to the type of powder, by way of an example, in case the measure pH is 6 after examining the pH of the solution in the wash tank through the pH measuring part, the control part opens the discharge valve to discharge the soluble component-removed powder through the powder discharge port. On the other hand, when the standard pH is set to 8 according to the type of powder, by way of another example, in case the measure pH is 8 after examining the pH of the solution in the wash tank through the pH measuring part, the control part opens the discharge valve to discharge the soluble component-removed powder through the powder discharge port. The above standard pHs are just examples and the standard pH used as a basis of determination of discharge time of powder depends on the type of powder put in, therefore is not limited the above exemplary values.

Further, the controller opens the discharge valve so that the soluble component-removed powder is discharged through the powder discharge port when the electric conductivity measured by the electric conductivity measuring instrument is a preset standard electric conductivity. The standard electric conductivity is also determined depending on the type of powder put in the wash tank.

When the standard electric conductivity is set to 12 µS according to the type of powder, by way of an example, in case the measure electric conductivity is 12 µS after examining the electric conductivity of the solution in the wash tank through the conductivity measuring instrument, the control part opens the discharge valve to discharge the soluble component-removed powder through the powder discharge port. On the other hand, when the standard electric conductivity is set to 1 mS according to the type of powder, by way of another example, in case the measure electric conductivity is 1 mS after examining the electric conductivity of the solution in the wash tank through the electric conductivity measuring instrument, the control part opens the discharge valve to discharge the soluble component-removed powder through the powder discharge port. The above standard electric conductivities are just examples and the standard electric conductivity used as a basis of determination of discharge time of powder depends on the type of powder put in, therefore is not limited the above exemplary values.

Further, the apparatus may include a powder-collecting tank that is disposed under the powder discharge port and collects the soluble component-removed powder discharged through the powder discharge port.

According to another embodiment of the invention, a method of collecting soluble component-removed powder may include: (a) filling soluble component- and poorly soluble component-containing powder and a solvent into a wash tank to remove the soluble component from the powder, before which, the soluble component- and poorly soluble component-containing powder is mixed with the solvent dissolving the soluble component of the powder and the soluble component is dissolved in the solvent; (b) discharging the solvent containing the soluble component of the powder as the soluble component of the powder is dissolved in the solvent in the wash tank outside through a pipe line, while vacuum pumping and filtering the solvent using a pump and a filter; (c) backwashing by inversely injecting a solvent to the filter through the pipe line to remove the soluble component-removed powder from the filter when the soluble component-removed powder is stuck on the surface of the filter; and (d) collecting the soluble component-removed powder by discharging the soluble component-removed powder out of the wash tank. Steps (a) to (d) are controlled by a control part.

The method may further include stirring the soluble component- and poorly soluble component-containing powder and the solvent in the wash tank using a stirrer mounted in the wash tank, after the step (a).

After the step (c), the control part examines the discharge time of the soluble component-removed powder received in the wash tank using a powder discharge time detecting means that detects the discharge time of the soluble component-removed powder received in the wash tank, and may discharge the soluble component-removed powder out of the wash tank during the discharge time and repeat the steps (b) and (c) during the time other than the discharge time.

ADVANTAGEOUS EFFECTS

The present invention relates to an apparatus for collecting soluble component-removed powder that collects poorly soluble component-containing powder to recycle by removing the soluble component from the soluble component- and poorly soluble component-containing powder by filtering using a vacuum pump after mixing soluble component- and poorly soluble component-containing powder and a solvent, and a method of the same. According to the invention, it can be easily achieved to collect and utilize powder, after the soluble component is dissolved in a solvent, by vacuum pumping the solvent through a filter and then discharging a solution containing only the soluble component, further effectively prevent overload by removing the powder stuck on the surface of the filter by backwashing.

In addition, due to the simply configuration, not only the initial cost of equipment is significantly reduced, but it has an advantageous of securing sufficient space because it can be used without a specific installation space.

DESCRIPTION OF DRAWINGS

FIG. 1 is a flowchart illustrating a method of removing a soluble component from soluble component- and poorly soluble component-containing powder and collecting poorly soluble component-containing powder according to an embodiment of the invention;

FIG. 2 is a view schematically illustrating the configuration of an apparatus removing a soluble component from the soluble component- and poorly soluble component-containing powder and collecting poorly soluble component-containing powder according to an embodiment of the invention;

FIG. 3 is a view illustrating the configuration of a collecting apparatus according to an embodiment of the invention including a bubble generator under a filter; and FIG. 4 is a view illustrating the configuration of a collecting apparatus according to an embodiment of the invention including powder collection tank, powder discharge time detecting means, and a discharge valve.

EXPLANATION OF THE SIGNS THAT ARE THE MAIN PART OF THE DRAWINGS

100: wash tank
110: solvent supplier
120: powder supplier
130: powder discharge port
131: discharge valve
132: powder-collecting tank
150: stirrer
152: motor
154: motor shaft
155: stirring fan
200: pump
250: pipe line
270: filter
310: first opening/closing valve
320: second opening/closing valve
330: third opening/closing valve
340: backwashing-solvent supply pipe line
400: control part
410: pressure sensor
420: timer
500: bubble generator
600: powder discharge time detecting means

MODE FOR INVENTION

The invention is described in detail hereafter with reference to accompanying drawings.

According to an embodiment of the invention, a method of removing a soluble component from soluble component- and poorly soluble component-containing powder and collecting poorly soluble component-containing powder, as described in FIG. 1, includes putting and mixing soluble component- and poorly soluble component-containing powder with a solvent in a wash tank (Step S1), pumping the mixed liquid outside the wash tank, in which as the soluble component of the powder is dissolved in the solvent, the liquid containing the soluble component is discharged outside through a filter and soluble component-removed and poorly soluble component-containing powder is not allowed to pass through the filter (Step S2), backwashing the filter by injecting a solvent from a pipe line to the filter to remove soluble component-removed and poorly soluble component-containing powder that is stuck on the surface of the filter while the liquid containing soluble component is discharged outside (Step S3), examining the discharge time of the soluble component-removed and poorly soluble component-containing powder (Step S4), discharging the poorly soluble component-containing powder out of the wash tank in the discharge time of powder and collecting the powder (Step S5), repeating Steps S2 and S3 during the time other than the discharge time.

A detailed example of a collecting method including Steps S1 to S5 may be composed of ① putting soluble component- and poorly soluble component-containing powder and a solvent into a wash tank→② mixing the powder with the solvent→③ discharging a solution containing soluble component outside the wash tank through a filter→④ backwashing when a load is generated by the poorly soluble component-containing powder stuck on the surface of the filter in discharging of the solution containing the soluble component outside the wash tank→⑤ repeating the steps of ③ and ④→⑥ examining a reference line (top dead center and bottom dead center) shown on the wash tank to determine when the solvent is put into the wash tank→⑦ examining powder discharge time, when the amount of the solvent in the wash tank is reduced to the bottom dead center by the repetition of the steps of ③ and ④→⑧ additionally supplying a solvent in the wash tank until it reaches the top dead center, when it is not the powder discharge time→⑨ re-processing from ② to ②→⑩ discharging poorly soluble component-containing powder out of the wash tank and collecting it, when it is the powder discharge time after the examination.

At Step S1, it is preferable to add stirring of the solvent using a stirrer rotated in the wash tank by a motor to easily dissolve an impurity, that is, the soluble component (for example, salt component) contained in the powder.

Further, at Step S2, it is preferable to form the filter at an end of the pipe line and mount a porous polymer filter, a ceramic filter, or a mesh-shaped metallic filter depending on the size of particles of powder to prevent the powder from passing, but the material is not limited thereto.

Furthermore, the filling, discharging, and backwashing of the solvent may be controlled according to pressure through checking vacuum negative pressure in the pipe line or at individual time by periodically repeating the vacuum pumping time and backwashing time.

On the other hand, an apparatus removing a soluble component from soluble component- and poorly soluble component-containing powder and collecting the poorly soluble component, as shown in FIG. 2, includes: a wash tank 100 that has an internal receiving space; a powder supplier 120 that is disposed above the wash tank 100 and supplies soluble component- and poorly soluble component-containing powder to the wash tank 100; a solvent supplier 110 that is disposed above the wash tank 100 and supplies a solvent dissolving the soluble component contained in the powder to the wash tank 100; a pipe line 250 of which an end is received in the wash tank 100 and the other end is placed outside the wash tank 100; a filter 270 that is provided at the end of the pipe line 250 in the wash tank 100; a pump 200, when the pump 200 is in operation, that is connected with the outside end of the pipe line 250 and applies vacuum negative pressure in the pipe line 250; a backwashing means that injects a solvent to the filter 270 through the pipe line 250 to remove, from the filter 270, the soluble component-removed powder stuck to the filter 270 in the pumping of the pump 200 as the soluble component is dissolved into the solvent, before which, the soluble component- and poorly soluble component-containing powder is mixed with the solvent in the wash tank 100; a powder discharge port 130 that is disposed at the bottom of the wash tank 100 and discharges the soluble component-removed powder out of the wash tank 100; a controller that individually controls the pump 200, backwashing means, and powder discharge port 130. Alternatively, the collecting apparatus according to an embodiment of the invention may further include a powder-collecting tank 132, shown in FIG. 4, which collects the soluble component-removed and poorly soluble component-containing powder discharged through the powder discharge port 130.

In detail, the solvent supplier 110 and the powder supplier 120, which are shaped as a pipe, are provided above the wash tank 100 to supply a solvent and powder, reference lines that indicate a top dead center and a bottom dead center are provided at the upper and lower portion of the wash thank to determine addition of a solvent, and the powder discharge port 130 is provided at the bottom to discharge the soluble component-removed and poorly soluble component-containing powder.

The discharging of the powder discharge port 130 may be automatically control led by the controller or manually control led by opening or closing a valve to discharge. As shown in FIG. 4 by way of example, the controller may control discharge/stop of discharge of the powder by turning on/off a discharge valve 131 according to data detected by a powder discharge time detecting means 600. The powder discharge time detecting means 600 may be a pH measuring part that measures pH of the solution in the wash tank 100 that contains a soluble component as the soluble component of the powder is dissolved in the solvent, or an electric conductivity measuring instrument that measures the conductivity of the solution in the wash tank 100 that contains a soluble component as the soluble component of the powder is dissolved in the solvent.

In case the powder discharge time detecting means 600 is the pH measuring part, it is preferable to control the powder discharge port 130 such that the powder is discharged when the pH of the solution in the wash tank 100 that is measured by the pH measuring part is a preset standard pH value.

On the other hand, in case the powder discharge time detecting means 600 is the electric conductivity measuring instrument, it is preferable to control the powder discharge port 130 such that the powder is discharged when the value of electric conductivity of the solution in the wash tank 100 that is measured by the electric conductivity measuring instrument is a preset standard value of electric conductivity.

A stirrer 150, which is rotated by outside power, may be provided, or not, in the wash tank 100 to mix the powder with the solvent, and is composed of a motor 152 that is disposed outside the wash tank 100, a motor shaft 154 that is connected to the motor 152 and capable of rotating in the wash tank 100, and a propeller-shaped stirring fan 155 that is rotatably connected at the end of the motor shaft 154.

A vane pump 200 may be used by way of an example of the pump 200 that generates vacuum negative pressure for discharging the solution in the wash tank 100 through the pipe line 250 by draining the fluid in the pipe line 250 outside.

It is preferable that the vacuum negative pressure of the pump 200 ranges in −0.01 to −1.5 kg/cm$^2$, but a possible pumping range is −0.1 to −0.99 kg/cm$^2$ in practice; however, if it is over or less than the range, vacuum negative pressure may not act or deteriorate the durability of components due to overpressure.

The filter 270 is fixed to the end of the pipe line 250 at a lower portion in the wash tank 100 and may be a polymer filter having air holes suitable to the particle size of the powder, a mesh-shaped metallic filter, or a porous ceramic filter. As for a mesh-shaped filter, it is preferable to size the air hole such that the powder can not pass and the solution in which a salt or soluble component is dissolved can pass the filter.

The backwashing means is composed of a first opening/closing valve 310 that is provided to the pipe line 250 between the filter 270 and the pump 200 and a second opening/closing valve 320 that is provided between the first opening/closing valve 310 and the filter 270 to supply water to the filter 270 from outside.

In backwashing, it is preferable that the pressure of a solvent supplied from outside ranges about 0.01 to 4.0 kg/cm$^2$, and the pressure should make the internal pressure of the pipe line 250, where the vacuum negative pressure is applied, positive, not negative, because excessive overpressure may cause deterioration of durability of components including the filter 270.

The first and second opening/closing valve 310 and 320 are turned on/off according to control signals and open/close respective flow passage, and the first opening/closing valve 310 opens its flow passage to discharge the solution in the wash tank 100 outside through the pipe line 250 in pumping of the pump 200, and closes the flow passage in backwashing.

The second opening/closing valve 320 is disposed on a backwashing-solvent supply pipe line 340 connecting the solvent supplier 110 and the pipe line 250, and is normally turned off, but is turned on while backwashing to supply the solvent in the solvent supplier 110 from the pipe line 250 to the filter 270 through the backwashing-solvent supply pipe line 340.

A third opening/closing valve 330, which is a solvent supply valve that is capable of controlling the flow of the solvent to the wash tank 100 or the backwashing-solvent supply pipe line 340, is provided for the solvent supplier 110.

The controller includes a pressure sensor 410 that is disposed in the pipe line 250 and senses the vacuum negative pressure in the pipe line 250 and a control part 400 that compares a pressure sensing signal of the pressure sensor 410 with a preset pressure and outputs a control signal controlling the on/off of the first and second opening/closing valve 310 and 320 for backwashing, when the compared signal becomes less than the preset pressure (when the vacuum negative pressure becomes larger than the preset pressure).

The reason the control part 400 determines the starting time of backwashing on the basis of the internal pressure of the pipe line 250 is that the vacuum negative pressure in the pipe line 250 is variable depending on the amount of powder stuck on the surface of the filter 270, thus can be a standard of judgment for overpressure.

It is preferable that the vacuum negative pressure set by the control part 400 is −0.8 kg/cm$^2$, which is, as described above, for preventing overpressure of the vacuum negative pressure.

Further, the backwashing is preferably processed for the preset time determined by the control part 400 and also variable depending on the supply pressure of the solvent.

The controller may select another control mode using a timer 420 such that the backwashing is periodically operated, on the basis of the size, content, component of the powder put into the wash tank 100 and the vacuum pumping time of the pump 200, not the vacuum pressure in the pipe line 250. For the above control mode, the vacuum pumping and the backwashing can be periodically repeated by inputting the sort and the property etc. of the powder as data in advance and making the control part 400 find a vacuum pumping time of the pump 200 that corresponds to each data and input them into the timer 420.

When the component of the solvent is inputted to the control part 400 before the solvent is put into the wash tank 100, the pumping time of the pump 200 corresponding to the data inputted in advance to the control part 400 can be calculated and the backwashing can be periodically operated by inputting the calculated time to the timer 420.

Alternatively, the timing of backwashing may be determined on the basis of the amount of fluid that is discharged to the pipe line through the filter using a flowmeter instead of the pressure sensor that senses the strength of the vacuum negative pressure.

The operation of an apparatus that removes a soluble component in soluble component-containing powder and collects the soluble component-removed powder is described hereafter.

In a collecting apparatus according to an embodiment of the invention, the third opening/closing valve 330 is turned on, a solvent is put into the wash tank 100 from the solvent supplier 110, and soluble component- and poorly soluble component-containing powder is put into the wash tank 100 from the powder supplier 120 and the they are mixed in the wash tank 100.

In the mixing, the soluble component contained in the powder is dissolved in the solvent and separated from the powder, and then the soluble component-containing solution resulting from the dissolution of the soluble component in the solvent is flowed into the pipe line 250 through the filter 270 by vacuum pumping of the pump 200.

As the solution flows, a filtering is applied, in which poorly soluble component (that is, solid in the solution)-containing powder is left in the wash tank 100 by the filter 270 disposed at the end of the pipe line 250, and the soluble component-containing solution resulting from the dissolution of the soluble component in the solvent passes through the filter 270 and is discharged through the pipe line 250.

The control part 400 turns on the first opening/closing valve 310 to open its flow passage and turns off the second opening/closing valve 320 to close its flow passage.

Meanwhile, backwashing is processed by a control mode on the basis of the above-mentioned vacuum negative pressure, operation timing, or discharge amount measured by a flowmeter. In the backwashing, after the first opening/closing valve 310 is turned off and its flow passage is closed, the second opening/closing valve 320 is turned on, the solvent in the solvent supplier 110 flows into the pipe line 250 through the backwashing solvent supply pipe line 340, and then flows in the wash tank 100 through the filter 270.

In the above backwashing, the third opening/closing valve 330 is closed and the solvent is supplied to the wash tank 100 through the second opening/closing valve 320 only.

After the backwashing is completed, the control part 400 allows the previous vacuum pumping by turning on the first opening/closing valve 310 again and off the second opening/closing valve 320, which results in repetition of the vacuum pumping and backwashing.

As the vacuum pumping and the backwashing is periodically repeated, the soluble component contained in the powder is separated and removed, and when it is determined that it, is the time the poorly soluble component-containing powder in the wash tank 100 starts to be discharged by the data measured at the powder discharge time detecting means 600, the powder is discharged outside through the powder discharge port 130 at the bottom of the wash tank 100. The soluble component-removed and poorly soluble component-containing powder discharged through the powder discharge port 130 can be collected by the powder-collecting tank 132 shown in FIG. 4.

According to the above embodiments of the invention, the controller can control the operation time using the vacuum negative pressure in the pipe line 250 or the timer 420, may periodically control the vacuum pumping and the backwashing using them.

Further, the controller can control the supply of the solvent and the soluble component- and poorly soluble component-containing powder such that it is automatically controlled on the basis of conditions, such as each component, particle size, and the content of the soluble component, but it is not largely different from common technologies in the art, therefore not described in detail.

On the other hand, as shown in FIG. 3, according to another embodiment of the invention, a common bubble generator 500 (for example, air pump) that is provided to the bottom in the tank 100 and guides bubbles generated by outside power to the filter 270 may be added to prevent powder from sticking on the surface of the filter 270.

The bubble generator 500 may be operated manually by a user or by control signals of the control part 400.

The present invention is useful for desalting of a salt and a fluorescent powder. Further, as for a chemical-mechanical CMP slurry having small particle size of powder, the invention has an advantage over known precipitation and is applicable to washing of a toner, but not limited thereto.

The powder described herein may be polymer powder (dye, toner etc.) or oxide powder (source powder, fluorescence, CMP powder, pigment etc.), the solvent may be water when the soluble component is a salt, and methanol, ethanol, acetone, hexane, or ether when the soluble component is an organic-soluble material, but is also not limited thereto.

The invention claimed is:

1. An apparatus for collecting soluble component-removed powder, comprising:
   a wash tank that has an internal receiving space;
   a powder supplier that is disposed above the wash tank and supplies soluble component- and poorly soluble component-containing powder to the wash tank;
   a solvent supplier that is disposed above the wash tank and supplies a solvent, capable of dissolving the soluble component contained in the powder to the wash tank;
   a pipe line of which an end is placed in the wash tank and the other end is placed outside the wash tank;
   a filter that is provided at the end of the pipe line in the wash tank;
   a pump that is connected with the outside end of the pipe line and applies vacuum negative pressure in the pipe line when the pump is in operation;
   a backwashing means that injects the solvent to the filter through the pipe line to remove, from the filter, the soluble component-removed powder stuck to the filter during the pumping of the pump as the soluble component is dissolved in the solvent, before which, the soluble component- and poorly soluble component-containing powder is mixed with the solvent in the wash tank;
   a powder discharge port that is disposed at a bottom of the wash tank and discharges the soluble component-removed powder out of the wash tank;
   a controller that individually controls the pump, the backwashing means, and the powder discharge port;
   a powder discharge time detecting means that detects the discharge time of the soluble component-removed powder discharged through the powder discharge port; and a discharge valve that is provided on the powder discharge port;
   wherein the controller opens or closes the powder discharge port by controlling the discharge valve on the basis of data detected by the powder discharge time detecting means, wherein the powder discharge time detecting means is any one of a pH measuring part that measures pH of a solution in the wash tank containing the soluble component and an electric conductivity measuring instrument that measures the electric conductivity of the solution in the wash tank containing the soluble component.

2. The apparatus according to claim 1, further comprising: a bubble generator that is disposed at a lower portion of the filter in the wash tank, generates bubbles, and guides the bubbles to the filter.

3. The apparatus according to claim 1, further comprising: a stirrer that is disposed in the wash tank and mixes the soluble component- and poorly soluble component-containing powder with the solvent.

4. The apparatus according to claim 1, further comprising: a solvent supply valve that is disposed on the solvent supplier and controls the flow rate of the solvent supplied into the wash tank.

5. The apparatus according to claim 1, wherein the backwashing means includes:
a first opening/closing valve that is provided to the pipe line between the filter and the pump and controls the flow of the solvent flowing from the filter to the pump by opening and closing according to control of the controller; and
a second opening/closing valve that is provided between the first opening/closing valve and the filter and controls the flow of the solvent supplied to the filter through the pipe line by opening and closing according to control of the controller.

6. The apparatus according to claim 5, wherein the backwashing means further includes:
a backwashing solvent supply pipe line of which an end is connected to the solvent supplier and the other end is connected to the pipe line and which is provided with the second opening/closing valve,
wherein the backwashing solvent supply pipe line guides the solvent of the solvent supplier to the pipe line so that the solvent of the solvent supplier flows to the filter through the pipe line when the first opening/closing valve is closed and the second opening/closing valve is open.

7. The apparatus according to claim 1, wherein the controller includes a control part that outputs a control signal to change the operation of the pump and backwashing means on the basis of preset data value depending on component and content of the powder that contains the soluble and poorly soluble component and the solvent that are put into the wash tank.

8. The apparatus according to claim 7, wherein the controller calculates a vacuum pumping time of the pump on the basis of preset data value at a control part, and periodically operates the backwashing in a control mode using a timer by inputting the calculated data to the timer.

9. The apparatus according to claim 1, wherein the controller includes:
a pressure sensor that senses the vacuum pressure in the pipe line; and
a control part that turns on the backwashing means when the pressure in the pipe line sensed by the pressure sensor is lower than a preset pressure.

10. The apparatus according to claim 9, wherein the pressure set by the control part is −0.8 kg/cm$^2$.

11. The apparatus according to claim 1, wherein the controller opens the discharge valve so that the soluble component-removed powder is discharged through the powder discharge port when the pH of the solution in the wash tank that is measured by the pH measuring part is a preset standard pH.

12. The apparatus according to claim 1, wherein the controller opens the discharge valve so that the soluble component-removed powder is discharged through the powder discharge port when the electric conductivity measured by the electric conductivity measuring instrument is a preset standard electric conductivity.

13. The apparatus according to claim 1, further comprising:
a powder-collecting tank that is disposed under the powder discharge port and collects the soluble component-removed powder discharged through the powder discharge port.

14. A method of collecting soluble component-removed powder, comprising the steps of:
(a) filling soluble component- and poorly soluble component-containing powder and a solvent into a wash tank to remove the soluble component from the powder, before which, the soluble component- and poorly soluble component-containing powder is mixed with the solvent dissolving the soluble component of the powder and the soluble component is dissolved in the solvent;
(b) discharging the solvent containing the soluble component of the powder as the soluble component of the powder is dissolved in the solvent in the wash tank outside through a pipe line, while vacuum pumping and filtering the solvent using a pump and a filter;
(c) backwashing by inversely injecting a solvent to the filter through the pipe line to remove the soluble component-removed powder from the filter when the soluble component-removed powder is stuck on the surface of the filter;
(d) examining the discharge time of the soluble component-removed powder received in the wash tank using a powder discharge time detecting means that detects the discharge time of the soluble component-removed powder received in the wash tank, discharging the soluble component-removed powder out of the wash tank during the discharge time, and repeating the steps (b) and (c) during the time other than the discharge time; and
(e) collecting the soluble component-removed powder by discharging the soluble component-removed powder out of the wash tank,
wherein the steps (a) to (e) are controlled by a control part, and
the powder discharge time detecting means is any one of a pH measuring part that measures pH of a solution in the wash tank containing the soluble component and an electric conductivity measuring instrument that measures the electric conductivity of the solution in the wash tank containing the soluble component.

15. The method according to claim 14, further comprising:
stirring the soluble component- and poorly soluble component-containing powder and the solvent in the wash tank using a stirrer mounted in the wash tank after the step (a).

* * * * *